US012753792B2

(12) United States Patent
Pao

(10) Patent No.: US 12,753,792 B2
(45) Date of Patent: Oct. 6, 2026

(54) PIVOT SHAFT ASSEMBLY FOR A FOLDABLE DEVICE

(71) Applicant: STEP2GOLD CO., LTD., Taichung City (TW)

(72) Inventor: Chih-Ting Pao, Taichung City (TW)

(73) Assignee: STEP2GOLD CO., LTD., Taichung City (TW)

( * ) Notice: Subject to any disclaimer, the term of this patent is extended or adjusted under 35 U.S.C. 154(b) by 184 days.

(21) Appl. No.: 18/924,389

(22) Filed: Oct. 23, 2024

(65) Prior Publication Data

US 2025/0146524 A1 May 8, 2025

(30) Foreign Application Priority Data

Nov. 2, 2023 (TW) ................................ 112142247

(51) Int. Cl.

| | |
|---|---|
| ***F16C 11/04*** | (2006.01) |
| ***A47C 4/28*** | (2006.01) |
| ***F16B 7/10*** | (2006.01) |
| *A47C 4/00* | (2006.01) |

(52) U.S. Cl.

CPC .............. *F16C 11/04* (2013.01); *A47C 4/286* (2013.01); *F16B 7/105* (2013.01); *A47C 4/00* (2013.01); *Y10T 403/32483* (2015.01)

(58) Field of Classification Search

CPC . A47C 4/286; A47C 4/48; F16B 7/042; F16B 7/105; Y10T 403/32483

See application file for complete search history.

(56) References Cited

U.S. PATENT DOCUMENTS

| | | | | |
|---|---|---|---|---|
| 615,476 A * | 12/1898 | Chapman | A47C 9/105 108/118 |
| 6,135,557 A * | 10/2000 | Gustafsson | A47C 4/286 297/16.2 |
| 7,384,097 B2 * | 6/2008 | Park | A47C 4/38 297/16.2 |

FOREIGN PATENT DOCUMENTS

| | | |
|---|---|---|
| TW | M427867 | 5/2012 |

* cited by examiner

*Primary Examiner* — Michael P Ferguson

(74) *Attorney, Agent, or Firm* — Burris Law, PLLC

(57) ABSTRACT

A pivot shaft assembly includes a shaft member extending through a base seat and including a fixed tubular piece pivotably connected with the base seat, and a movable tubular piece movably disposed within the fixed tubular piece. The fixed and movable tubular pieces respectively have a retreated hole and a through hole extending radially. A fastening member has an engaging protrusion resiliently projecting from the through hole. In a fastened state, the shaft member is inclined and the through hole is aligned with the retreated hole to permit the engaging protrusion to extend through the retreated hole so as to retain the movable tubular piece to the fixed tubular piece. During shifting to a releasable state where the shaft member extends parallel, the engaging protrusion is pressed by a fastener releasing portion and retreated into the retreated hole to permit movement of the movable tubular piece.

9 Claims, 13 Drawing Sheets

PIVOT SHAFT ASSEMBLY FOR A FOLDABLE DEVICE

CROSS-REFERENCE TO RELATED APPLICATION

This application claims priority to Taiwanese Patent Application No. 112142247, filed on Nov. 2, 2023, and incorporated by reference herein in its entirety.

FIELD

The disclosure relates to a foldable device with a pivot shaft assembly, and more particularly to a pivot shaft assembly with an automatic fastener releasing function.

BACKGROUND

A conventional folding crutch chair disclosed in TWM427867U includes a positioning seat, three rotatable legs rotatably extending through the positioning seat, and a cloth attached to upper ends of the legs. Each rotatable leg has an outer tube, an inner tube movably disposed within the outer tube, and a positioning pin. The outer tube has a through hole. The inner tube has a plurality of positioning holes. The positioning pin extends through the through hole and is engaged in a selected one of the positioning holes so as to retain the inner tube to the outer tube and fix the length of the leg. When the folding crutch chair is folded, the legs are rotated to be close together and parallel to one another, and the inner tube of each leg is retracted into the outer tube.

During unfolding the folding of the crutch chair and adjusting the length of the legs for use, it is required to rotate and spread out the legs, and pull the positioning pins out of the inner tubes and then align and insert the positioning pins into the through holes of the outer tubes to adjust the length of the legs, which is time-consuming and laborious.

SUMMARY

Therefore, an object of the disclosure is to provide a pivot shaft assembly for a foldable device that can alleviate at least one of the drawbacks of the prior art.

According to the disclosure, the pivot shaft assembly includes a pivot base, a shaft member and a fastening member. The pivot base includes a base seat, an axial hole which extends through the base seat in a first direction, and a fastener releasing portion which is disposed on the base seat. The shaft member extends along a central axis through the axial hole. The shaft member includes a fixed tubular piece which extends through the axial hole and which has a fixed tubular wall surrounding the central axis, and a movable tubular piece which is movably disposed within the fixed tubular piece and which has a movable tubular wall surrounding the central axis. The fixed tubular piece is pivotably coupled with the base seat about a rotating axis which is transverse to the central axis. The fixed tubular piece has a retreated hole which extends radially relative to the central axis through the fixed tubular wall. The movable tubular piece has a through hole which extends radially relative to the central axis through the movable tubular wall. The fastening member is disposed within the movable tubular piece. The fastening member has an engaging protrusion which resiliently projects from the through hole and which has an engaging end disposed outwardly of the through hole. When the pivot shaft assembly is in a fastened state, the shaft member is inclined relative to the first direction by a predetermined inclined angle, the retreated hole of the fixed tubular piece is remote from the fastener releasing portion, the through hole is aligned with the retreated hole, the engaging protrusion extends through the retreated hole to have the engaging end be outwardly of the retreated hole such that the movable tubular piece is not movable relative to the fixed tubular piece. During shifting of the pivot shaft assembly to a releasable state where the shaft member extends parallel to the first direction, the engaging protrusion abuts against and is pressed by the fastener releasing portion along with rotation of the shaft member relative to the base seat to bring the engaging end to be retreated into the retreated hole so as to permit movement of the movable tubular piece relative to the fixed tubular piece.

With the fastener releasing portion of the base seat, during rotation of the shaft member, the engaging protrusion of the fastening member is pressed by the fastener releasing portion and retreated into the retreated hole so as to shift the shaft member to the releasable state for permitting retraction of the movable tubular piece into the fixed tubular piece, which renders the folding operation of the shaft member easy and rapid, and avoids pinching the user.

BRIEF DESCRIPTION OF THE DRAWINGS

Other features and advantages of the disclosure will become apparent in the following detailed description of the embodiment with reference to the accompanying drawings. It is noted that various features may not be drawn to scale.

DETAILED DESCRIPTION

Figure 1:
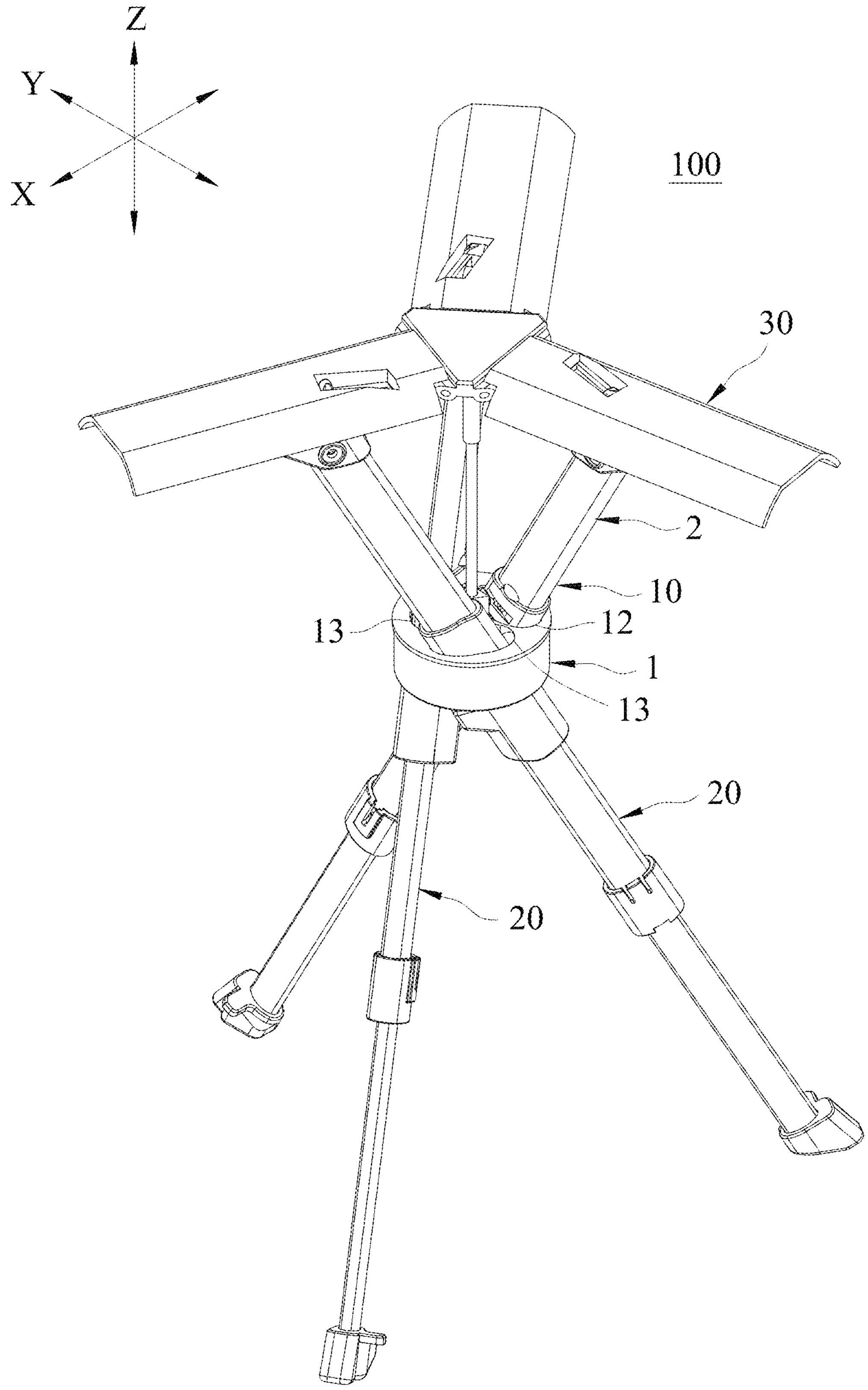
FIG. 1 is a perspective view of a foldable device in a spread state, the foldable device including an embodiment of a pivot shaft assembly, two support shafts and a linking unit, illustrating the embodiment in a fastened state.

It should be noted herein that for clarity of description, spatially relative terms such as "top," "bottom," "upper,"

"lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly. In the following description, a first direction (Z), a second direction (X) and a third direction (Y) are transverse to one another. The first direction (Z) is substantially an up-down direction.

Referring to FIG. 1, an embodiment of a pivot shaft assembly 10 according to the disclosure is adapted for a foldable device 100. The foldable device 100 includes the pivot shaft assembly 10, two support shafts 20 and a linking unit 30.

Figure 2:
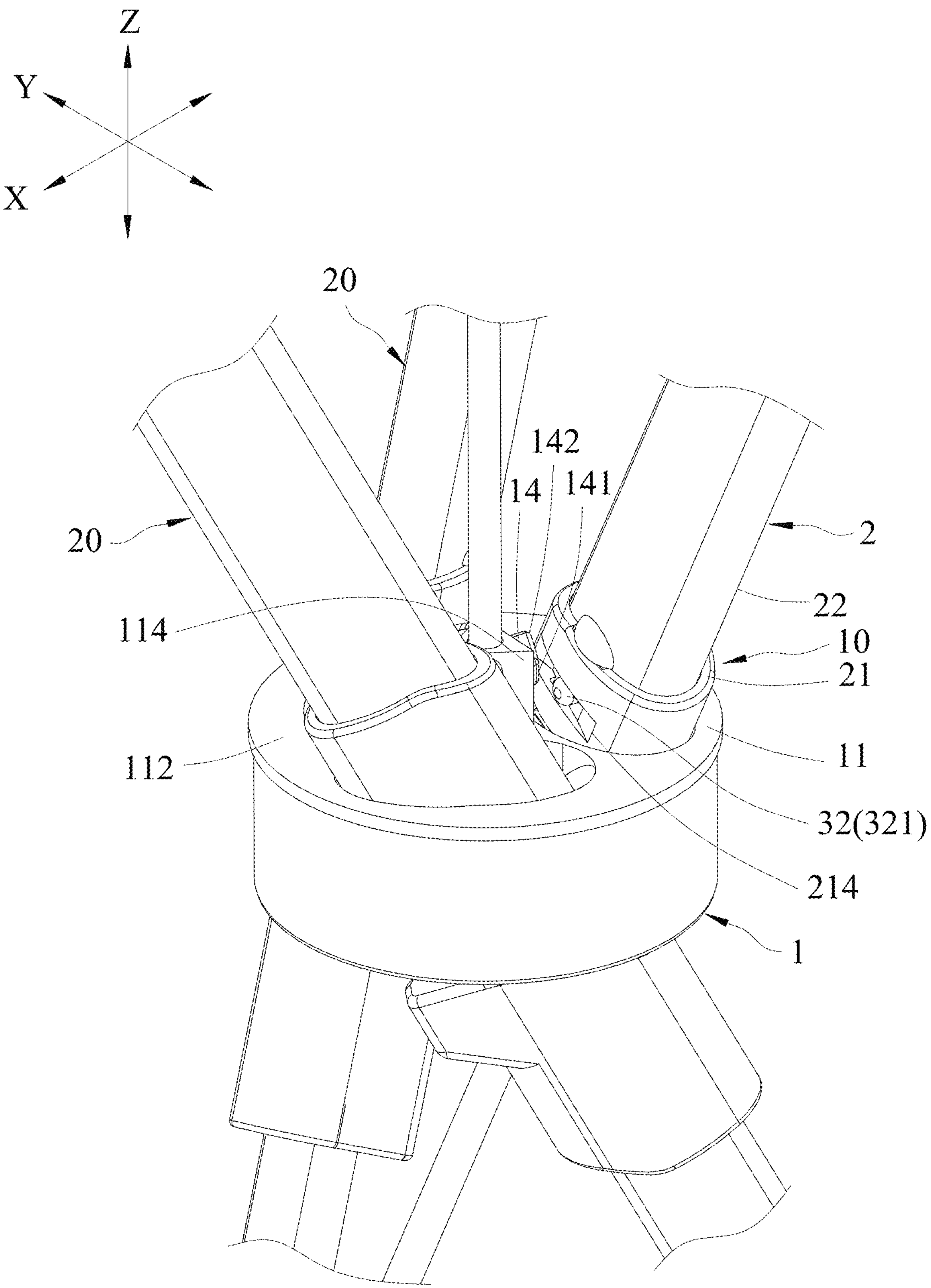
FIG. 2 is a fragmentary perspective view of a portion of FIG. 1.
Figure 3:
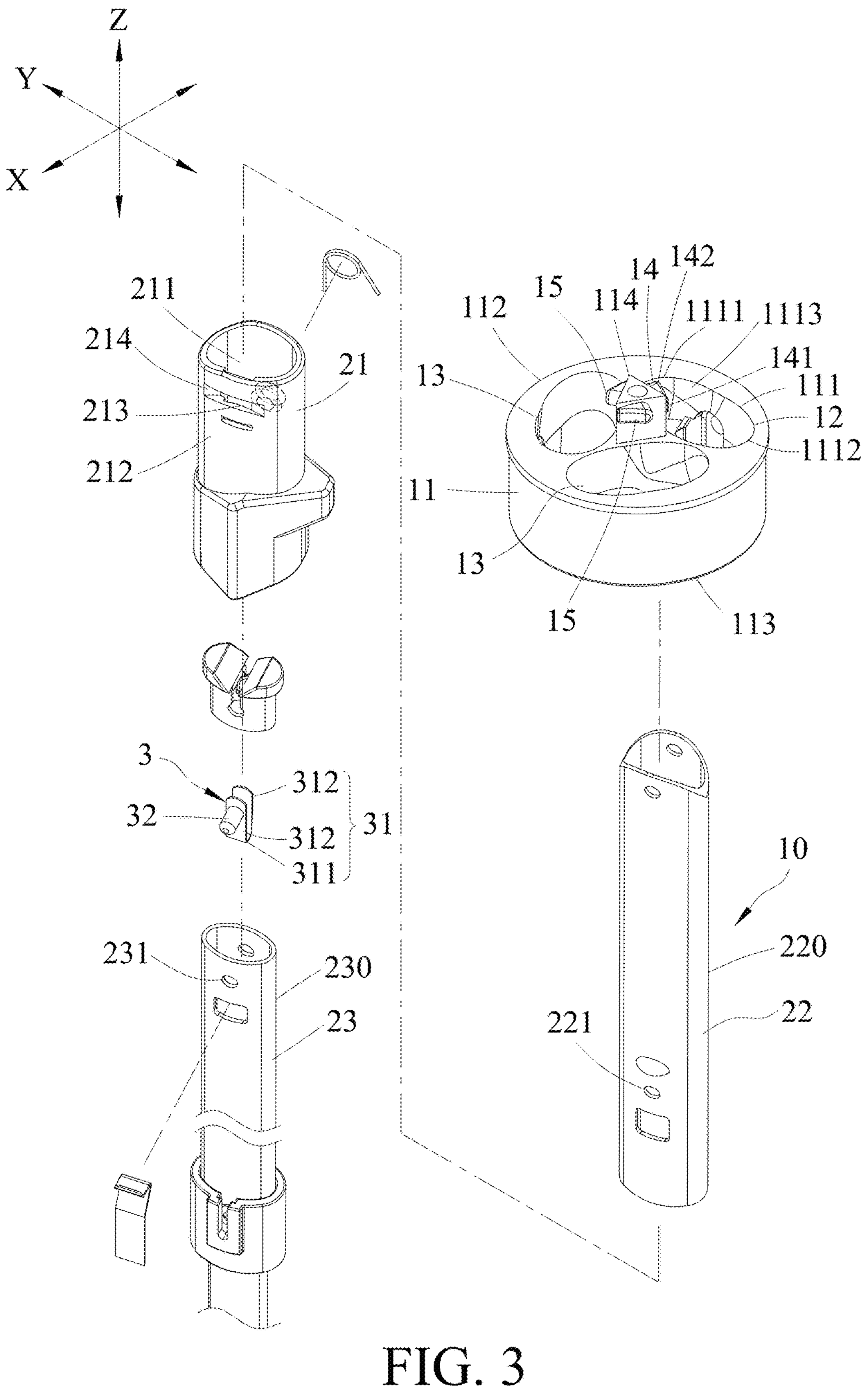
FIG. 3 is a fragmentary, exploded perspective view of the embodiment.

With reference to FIGS. 2 and 3, the pivot shaft assembly 10 includes a pivot base 1, a shaft member 2 and a fastening member 3.

The pivot base 1 includes a base seat 11, an axial hole 12 which extends through the base seat 11 in the first direction (Z), two support holes 13 which extend through the base seat 11 in the first direction (Z), a fastener releasing portion 14 which is disposed on the base seat 11, and two releasing guiding portions 15 which are disposed on the base seat 11. The base seat 11 includes an inner seat wall 111 which defines the axial hole 12, a first end wall 112 and a second end wall 113 which are respectively connected with two sides of the inner seat wall 111 along the first direction (Z) and opposite to each other, and an axle seat portion 114 which protrudes from the first end wall 112. The axial hole 12 and the support holes 13 are angularly spaced apart from one another along a periphery of the axle seat portion 114. The axle seat portion 114 is located at an inner side of the axial hole 12 and is spaced apart from the axial hole 12 in the second direction (X). The inner seat wall 111 has a first inner wall section 1111 and a second inner wall section 1112 which are opposite to each other along a third direction (Y), and at two sides of the axial hole 12, respectively, and a connecting wall section 1113 which interconnects the first inner wall section 1111 and the second inner wall section 1112. The second end wall 113 is located below the first end wall 112.

Figure 4:
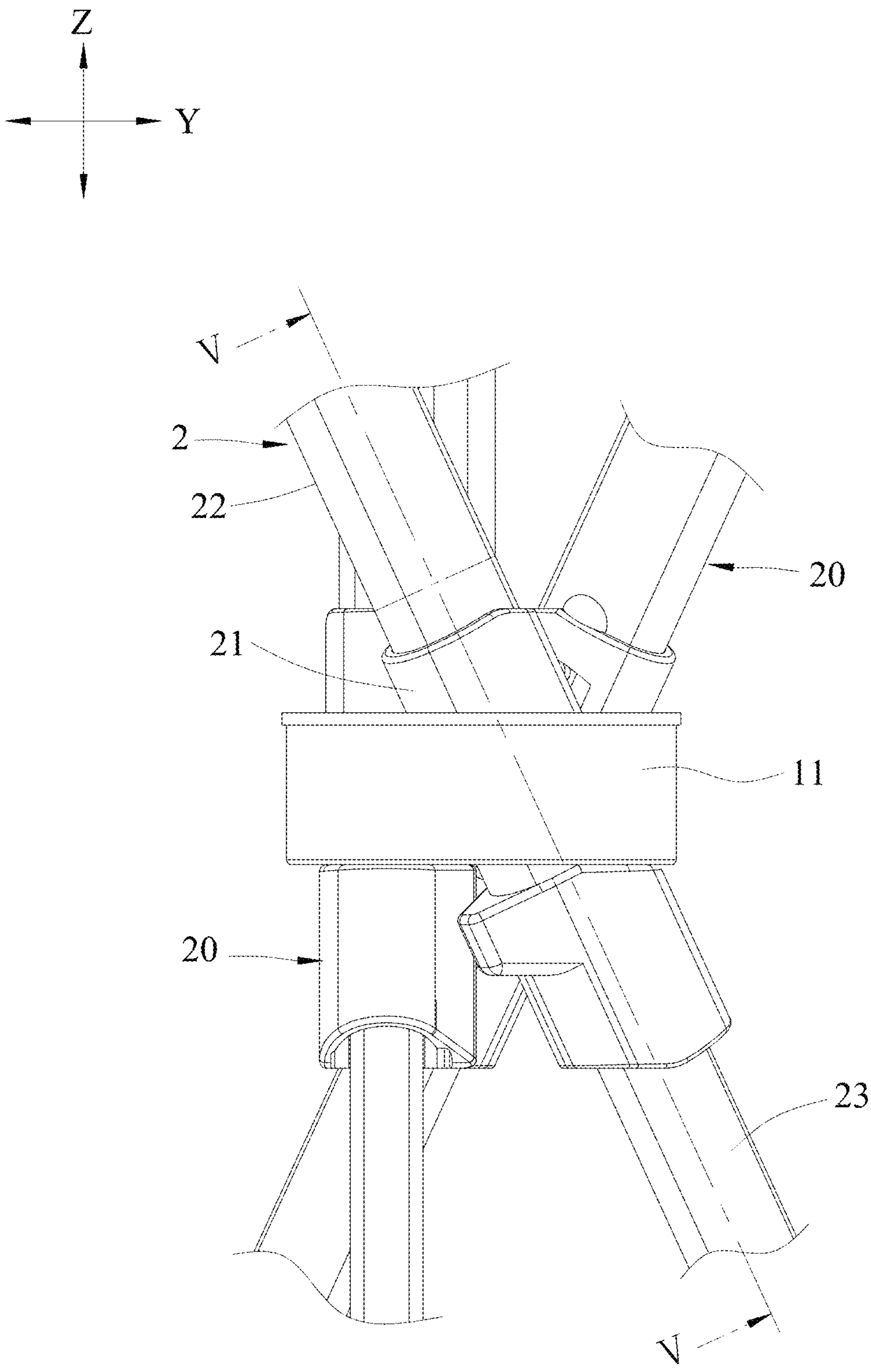
FIG. 4 is a fragmentary side view taken from another angle of FIG. 1.
Figure 5:
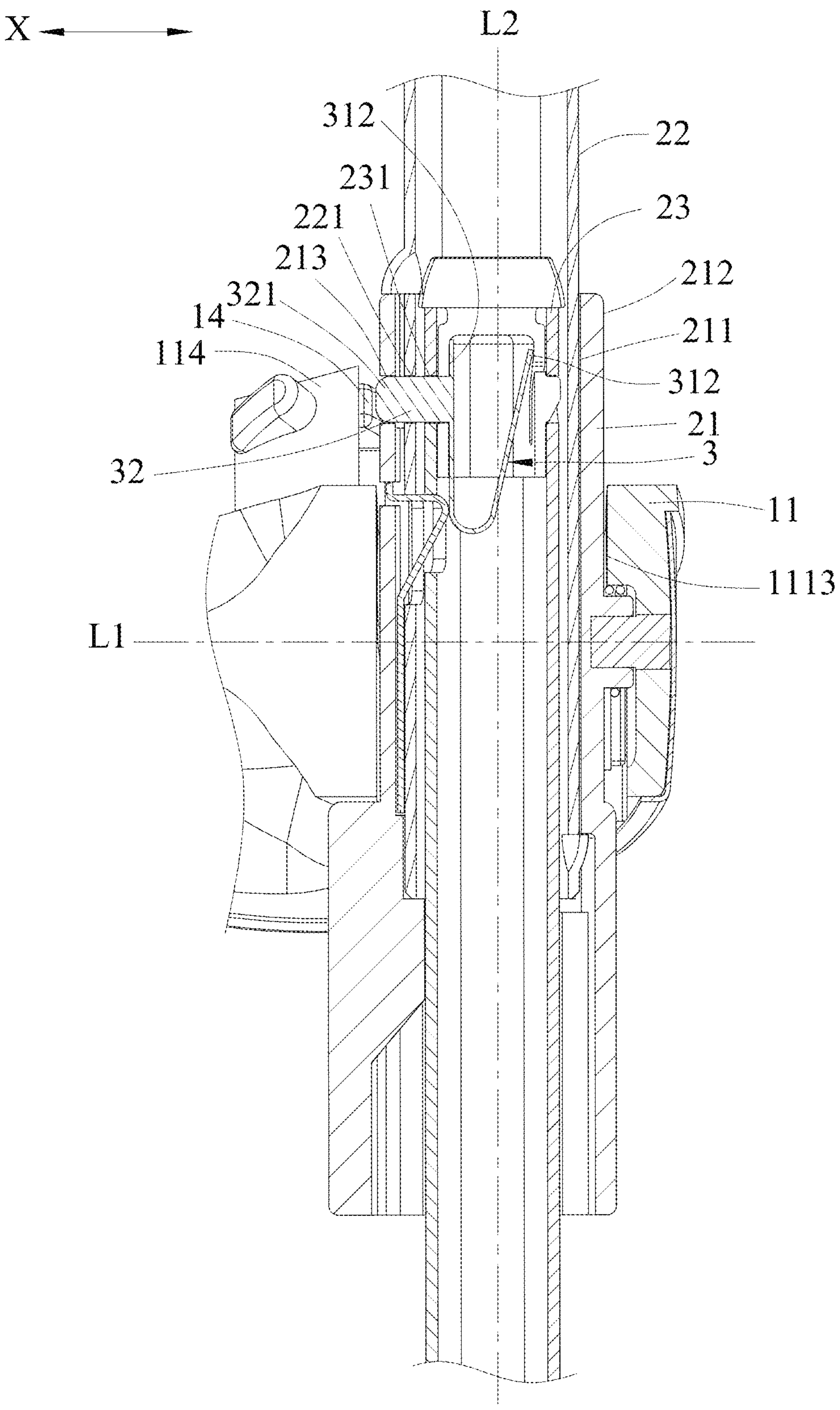
FIG. 5 is a sectional view taken along line V-V of FIG. 4, the support shafts being removed for the sake of clarity.

With reference to FIGS. 3 to 5, a rotating axis (L1) is defined and extends along the second direction (X) to be normal to the connecting wall section 1113. The fastener releasing portion 14 is formed and protrudes from the axle seat portion 114 toward the axial hole 12 in a direction parallel to the rotating axis (L1) (i.e., the second direction (X)). The fastener releasing portion 14 has a narrow section 141 which extends from the axle seat portion 114 toward the axial hole 12 by a length and which is formed proximal to the second inner wall section 1112, and a wide section 142 which extends from the axle seat portion 114 toward the axial hole 12 by a length that is larger than the length of the narrow section 141 and which is formed proximal to the first inner wall section 1111. The releasing guiding portions 15 are formed and project from the axle seat portion 114 toward the support holes 13, respectively. The fastener releasing portion 14 and the releasing guiding portions 15 are angularly spaced apart from one another along a periphery of the axle seat portion 114.

The shaft member 2 extends along a central axis (L2) through the axial hole 12. Specifically, the shaft member 2 includes a tubular seat 21 which extends in the axial hole 12 and surrounds the central axis (L2), a fixed tubular piece 22 which is secured within the tubular seat 21 and extends upwardly from the tubular seat 21, and a movable tubular piece 23 which is movably inserted into the tubular seat 21 and the fixed tubular piece 22. The fixed tubular piece 22 has a fixed tubular wall 220 surrounding the central axis (L2). The movable tubular piece 23 has a movable tubular wall 230 surrounding the central axis (L2). The tubular seat 21 is pivotably connected with the connecting wall section 1113 about the rotating axis (L1). Thus, the tubular seat 21, the fixed tubular piece 22 and the movable tubular piece 23 are rotated together relative to the base seat 11. The fixed tubular piece 22 is pivotably coupled with the base seat 11 through the tubular seat 21. The tubular seat 21 has an inner surrounding surface 211 which faces and surrounds the fixed tubular wall 220 of the fixed tubular piece 22, an outer surrounding surface 212 which is radially opposite to the inner surrounding surface 211 and which is pivotably connected with the base seat 11, and a fastener hole 213 which extends radially from the inner surrounding surface 211 to the outer surrounding surface 212. The outer surrounding surface 212 has a passage 214 which is formed in communication with the fastener hole 213. The passage 214 has a width extending along a direction transverse to both the rotating axis (L1) and the central axis (L2) (i.e. the third direction (Y)) to permit fitted insertion of the fastener releasing portion 14 therein so as to prevent movement of the fastener releasing portion 14 in the third direction (Y) relative to the tubular seat 21.

The fixed tubular piece 22 has a retreated hole 221 which extends radially along a direction parallel to the rotating axis (L1) through the fixed tubular wall 220 and is in communication with the fastener hole 213. The movable tubular piece 23 has a through hole 231 which extends radially along the direction parallel to the rotating axis (L1) through the movable tubular wall 230. The movable tubular piece 23 is movable relative to the fixed tubular piece 22 to permit alignment of the through hole 231 with the retreated hole 221 and the fastener hole 213. The shaft member 2 is rotatable relative to the base seat 11 to permit alignment of the fastener releasing portion 14 with the fastener hole 213, the retreated hole 221 and the through hole 231.

The fastening member 3 is disposed within the movable tubular piece 23, and includes a leaf spring 31 and an engaging protrusion 32. The leaf spring 31 has a curved portion 311 which extends arcuately to terminate at two ends opposite to each other, and first and second biasing portions 312 which respectively extend from the two ends of the curved portion 311 and away from each other. The first biasing portion 312 abuts against the movable tubular piece 23, and the second biasing portion 312 is connected with the engaging protrusion 32 to bias the engaging protrusion 32 away from the first biasing portion 312 to resiliently project from the through hole 231. The engaging protrusion 32 has an engaging end 321 disposed outwardly of the through hole 231, and a slope edge surface 3211 at the engaging end 321.

With reference to FIG. 1, the support shafts 20 respectively extend through the support holes 13 and are pivotably connected with the base seat 11. The linking unit 30 is foldably coupled with upper ends of the shaft member 2 and the support shafts 20.

With reference to FIG. 1, when the foldable device 100 is in a spread state, the shaft member 2 and the support shafts 20 are spread out relative to the base seat 11 and are inclined to and intersect one another. The linking unit 30 is spread out by the shaft member 2 and the support shafts 20 for a user to sit thereon. With reference to FIGS. 2 and 5, at this stage, the pivot shaft assembly 10 is in a fastened state, where the fastener hole 213 of the tubular seat 21 and the retreated hole 221 of the fixed tubular piece 22 are remote from the fastener releasing portion 14, the through hole 231 is aligned with the retreated hole 221 and the fastener hole 213, the engaging protrusion 32 extends through the retreated hole 221 and the fastener hole 213 to have the engaging end 321 be outwardly of the fastener hole 213, and thus the movable tubular piece 23 is not movable relative to the fixed tubular piece 22.

Figure 6:
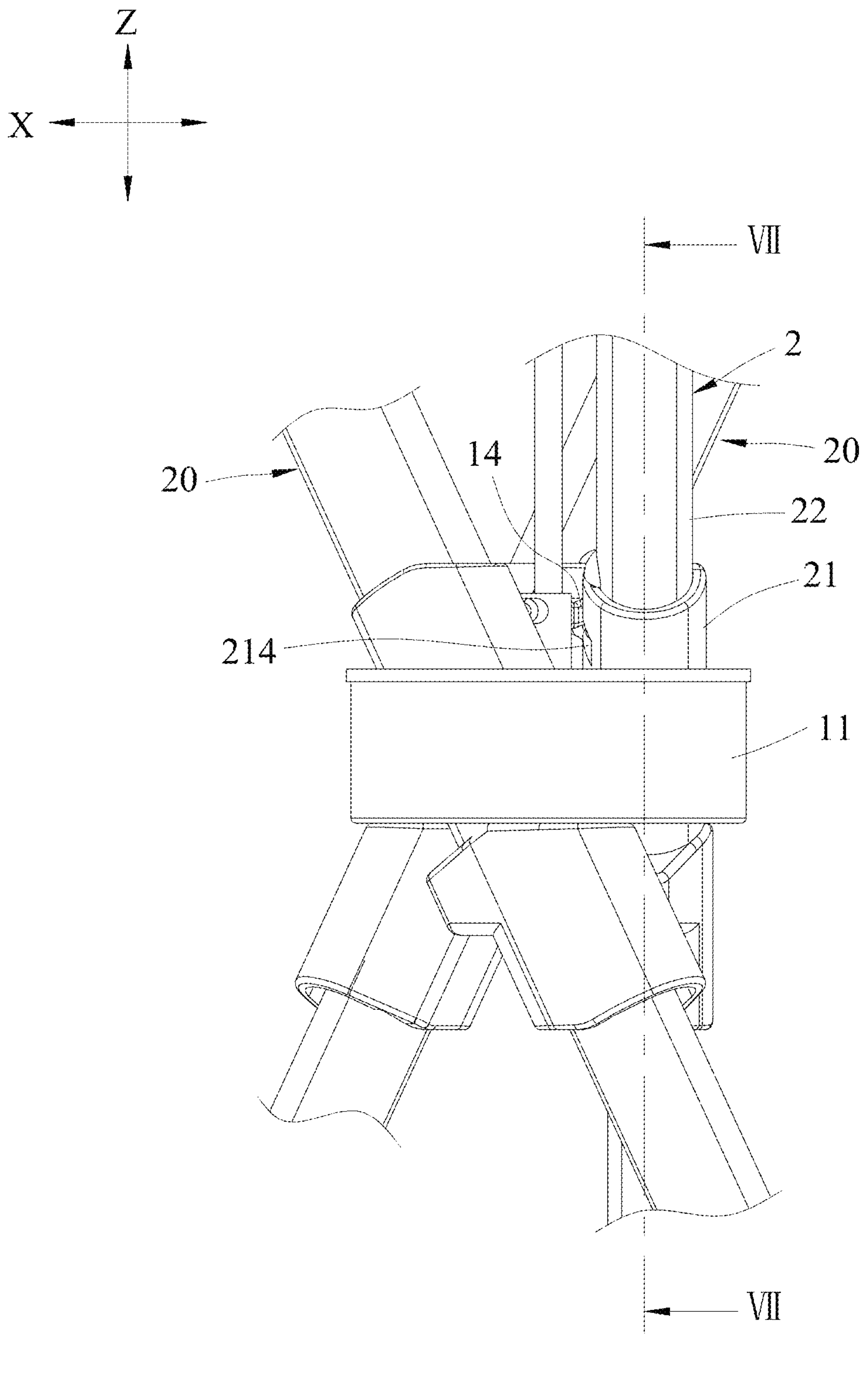
FIG. 6 is a fragmentary side view taken from another angle of FIG. 1.
Figure 7:
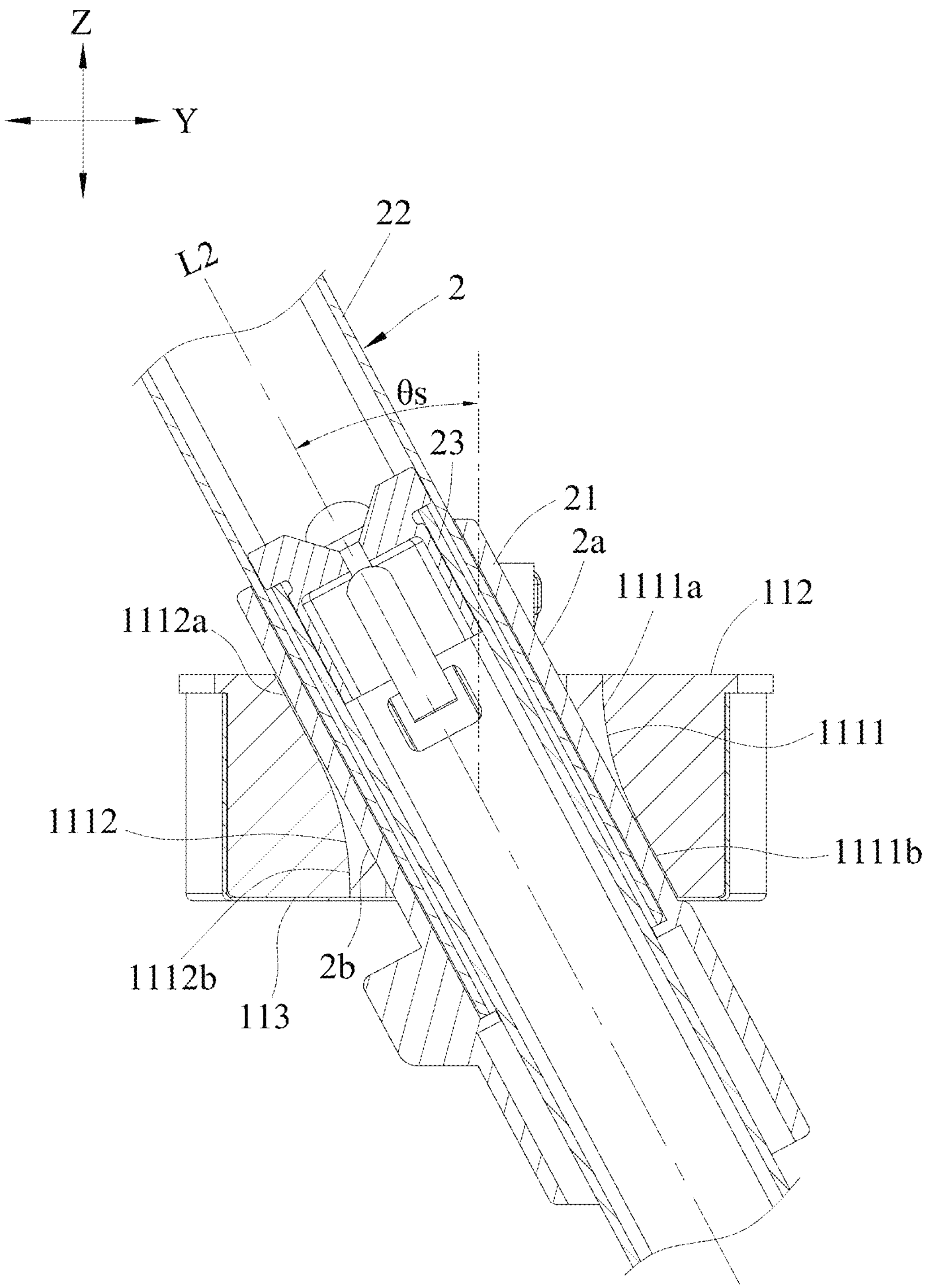
FIG. 7 is a sectional view taken along line VII-VII of FIG. 6, the support shafts being removed for the sake of clarity.

With reference to FIGS. 6 and 7, at this stage, the shaft member 2 is inclined relative to the first direction (Z) by a predetermined inclined angle (θs). Each of the first inner wall section 1111 and the second inner wall section 1112 extends and is inclined relative to the first direction (Z). Thus, at this stage, a first side (2*a*) of the shaft member 2 facing the first inner wall section 1111 abuts against a second portion (1111*b*) of the first inner wall section 1111 proximate to the second end wall 113, and is spaced apart from a first portion (1111*a*) of the first inner wall section 1111 proximal to the first end wall 112, and a second side (2*b*) of the shaft member 2 facing the second inner wall section 1112 abuts against a first portion (1112*a*) of the second inner wall section 1112 proximal to the first end wall 112, and is spaced apart from a second portion (1112*b*) of the second inner wall section 1112 proximal to the second end wall 113.

Figure 8:
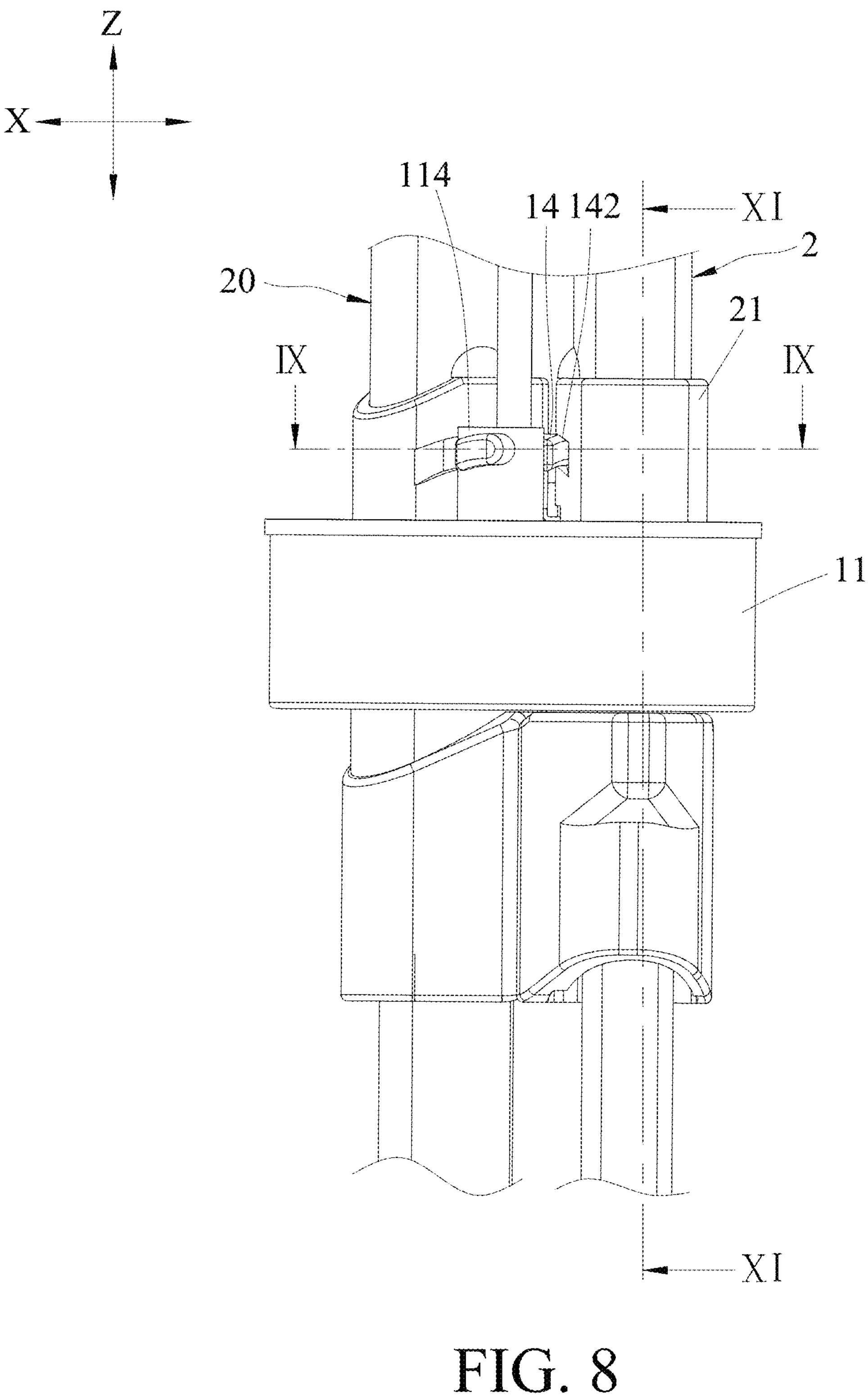
FIG. 8 is a fragmentary side view illustrating the foldable device in a folded state and the embodiment in a releasable state, one of the support shafts and the linking unit being removed for the sake of clarity.
Figure 9:
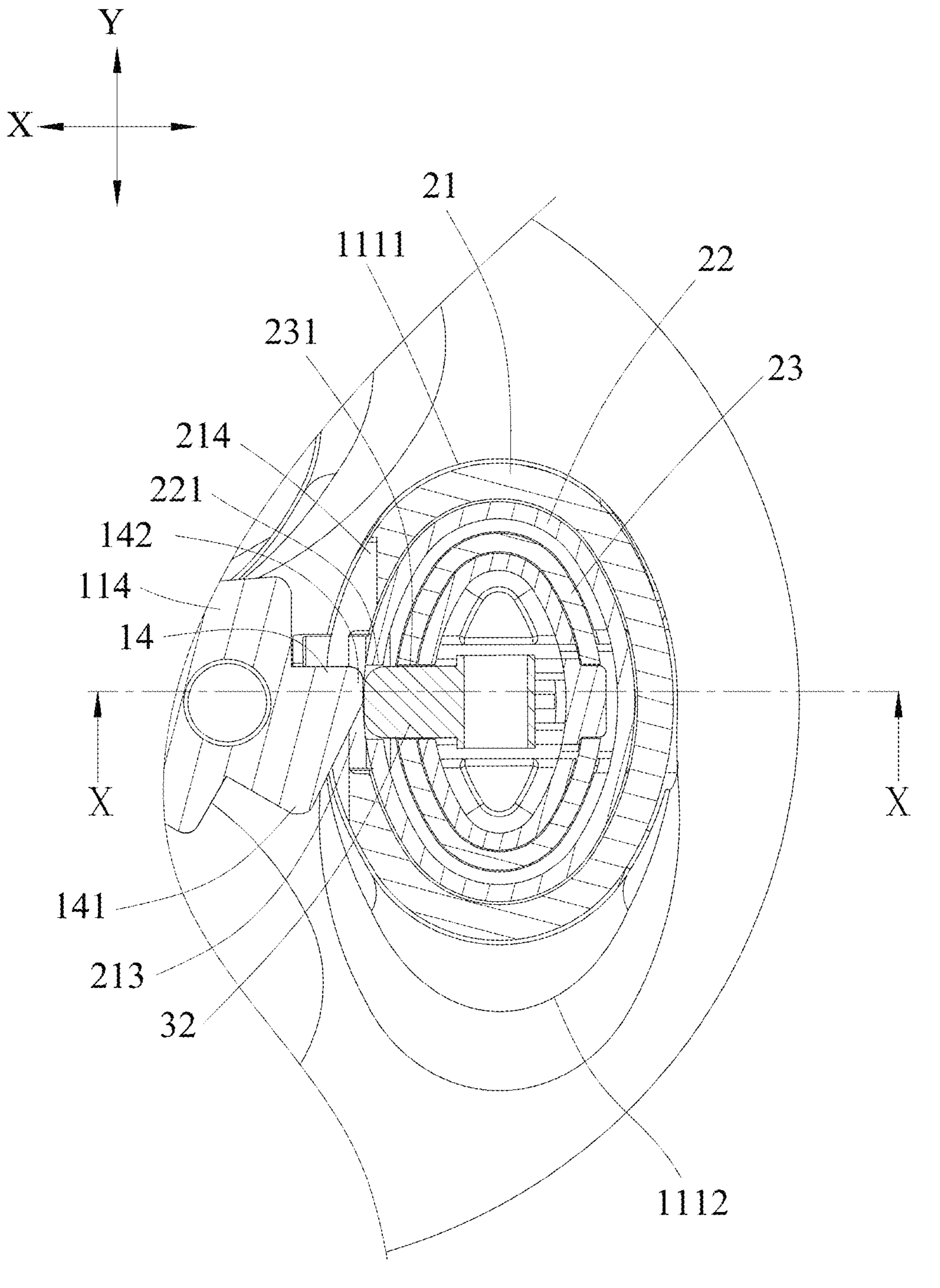
FIG. 9 is a fragmentary sectional view taken along line IX-IX of FIG. 8.
Figure 10:
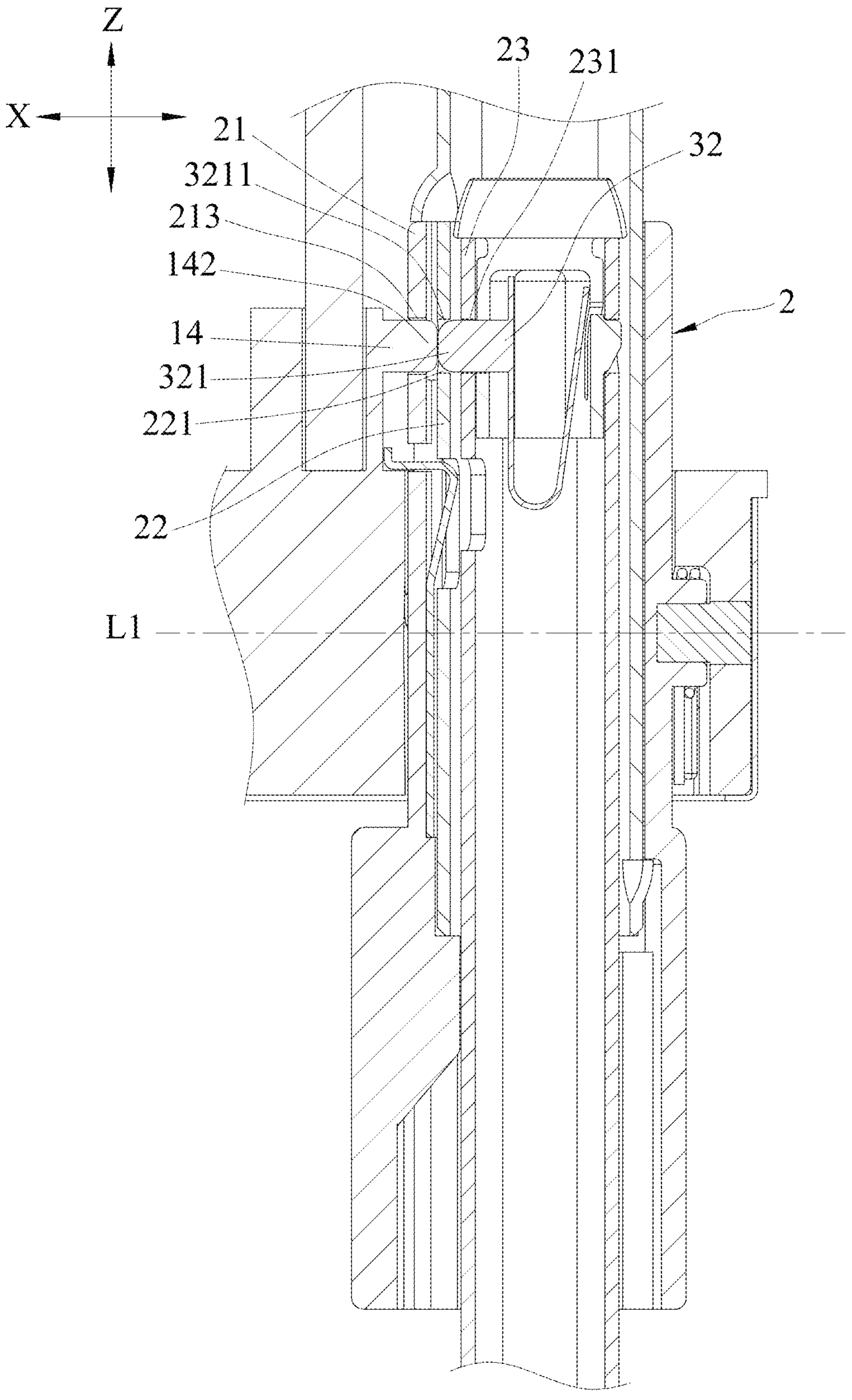
FIG. 10 is a fragmentary sectional view taken along line X-X of FIG. 9.

With reference to FIGS. 8 to 10 which illustrate when the foldable device 100 is in a folded state, the pivot shaft assembly 10 is in a releasable state, where the fastener releasing portion 14 is inserted into the fastener hole 213, and the engaging end 321 of the engaging protrusion 32 is pressed by the fastener releasing portion 14 and retreated into the retreated hole 221 so as to permit the movement of the movable tubular piece 23 relative to the fixed tubular piece 22 and retraction of the movable tubular piece 23 into the fixed tubular piece 22.

Figure 11:
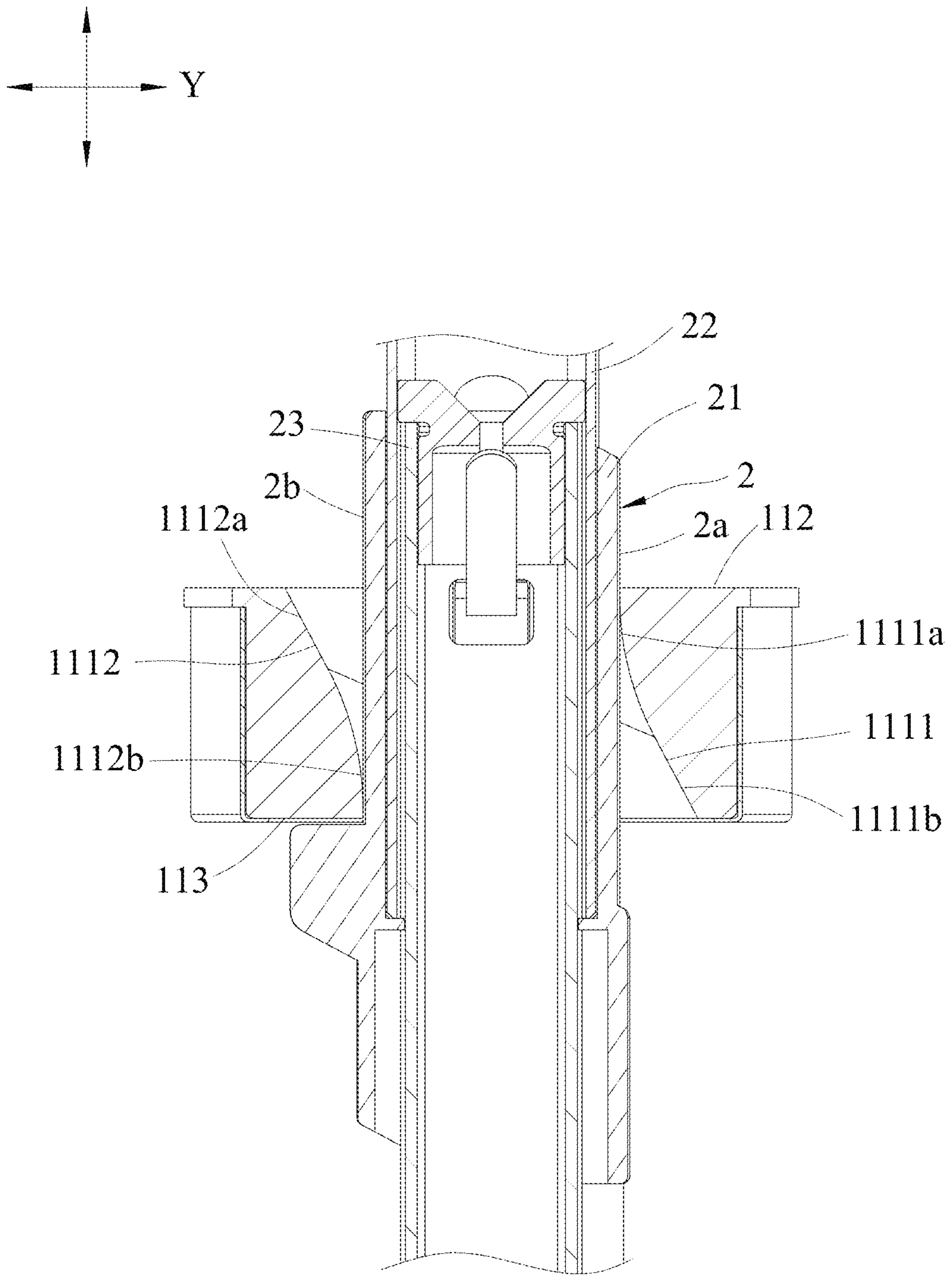
FIG. 11 is a fragmentary sectional view taken along line XI-XI of FIG. 8, the support shafts being removed for the sake of clarity.
Figure 12:
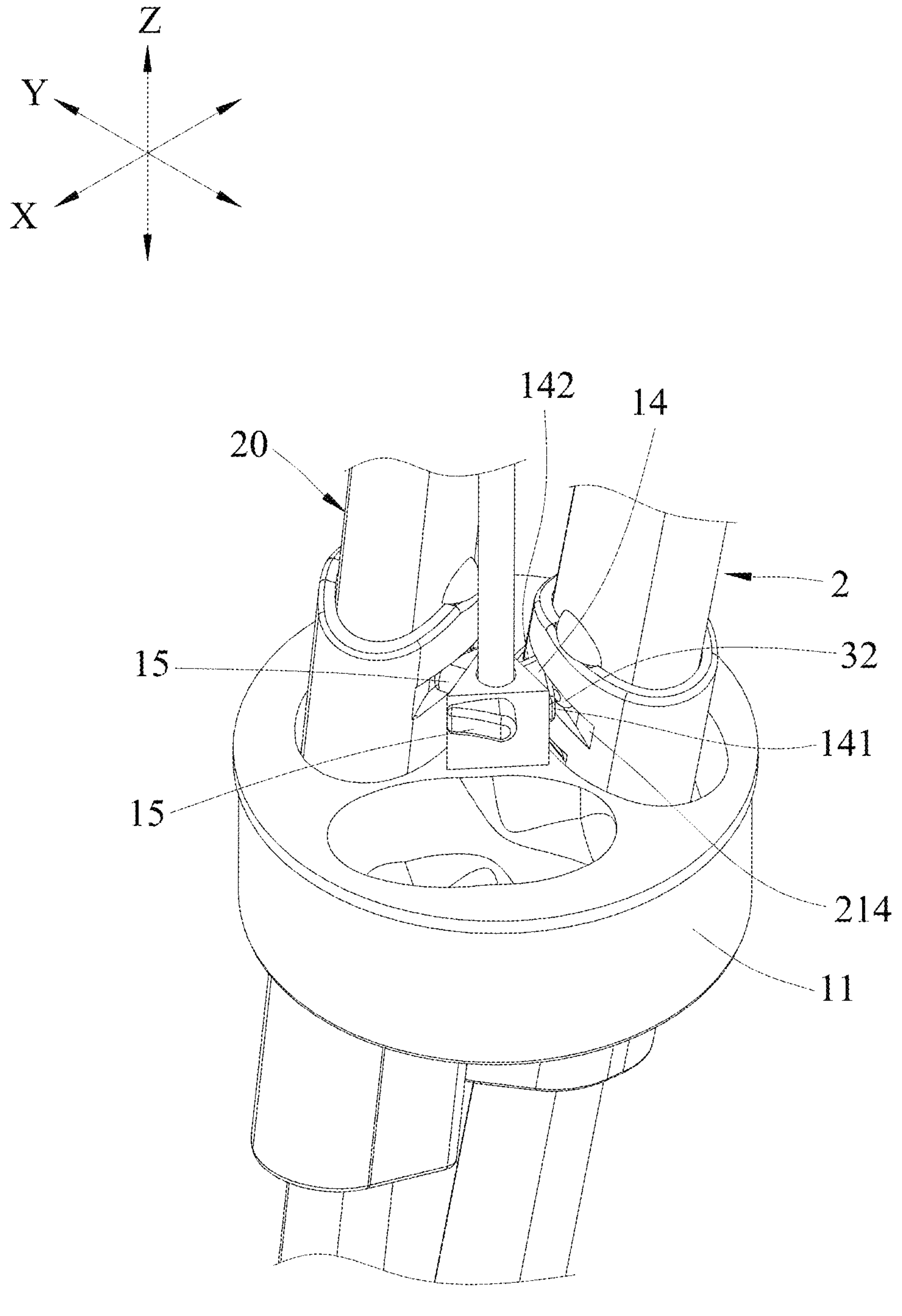
FIG. 12 is a fragmentary perspective view illustrating the foldable device during shifting from the spread state to the folded state, the embodiment during shifting from the fastened state to the releasable state, one of the support shafts and the linking unit being removed for the sake of clarity.
Figure 13:
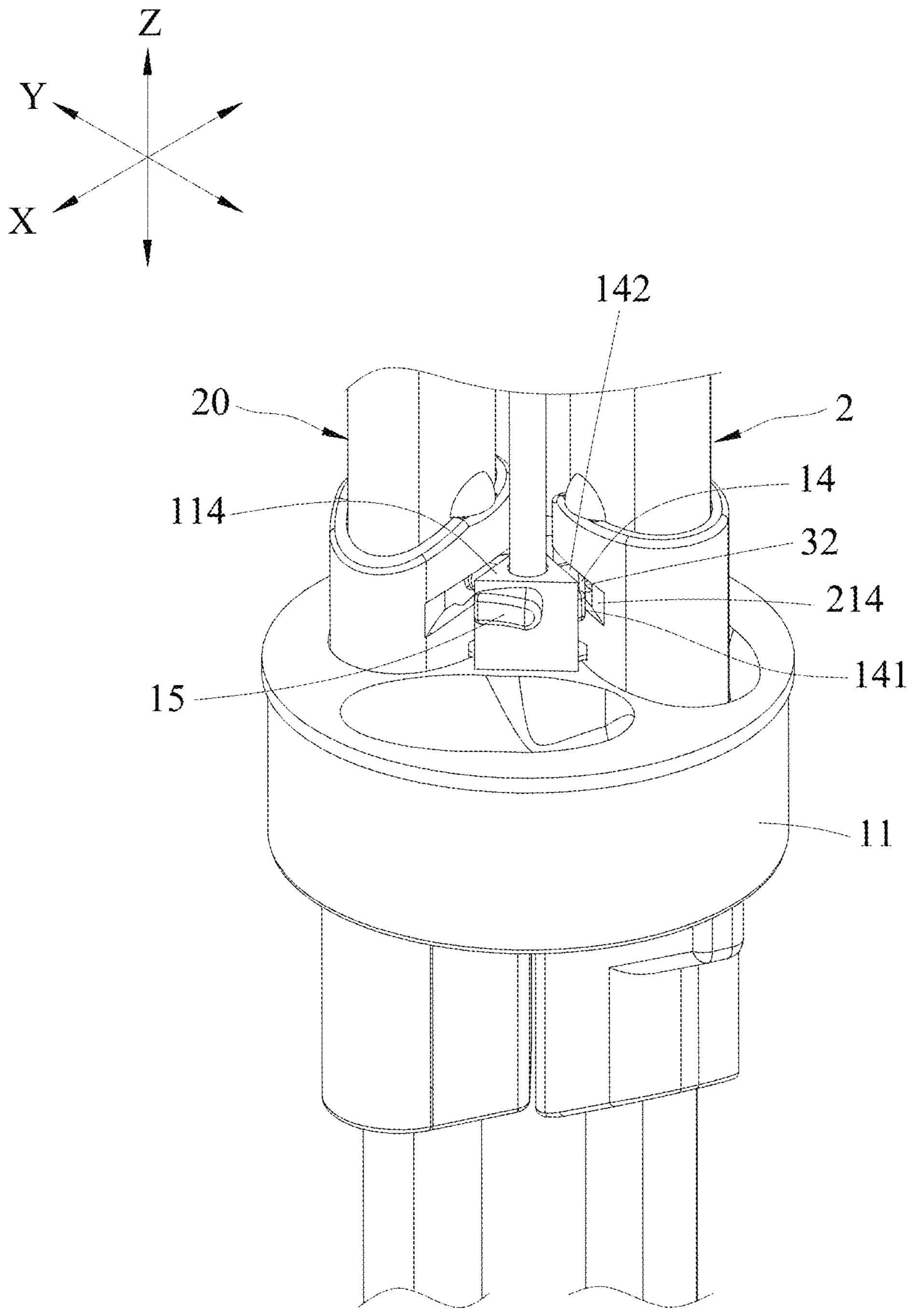
FIG. 13 is a fragmentary perspective view similar to FIG. 12, illustrating the foldable device in the folded state and the embodiment in the releasable state.

With reference to FIGS. 8 and 11, at this stage, the support shafts 20 and the shaft member 2 extend parallel to the first direction (Z) (only one support shaft 20 is shown in FIGS. 8, 12 and 13), the first side (2*a*) of the shaft member 2 facing the first inner wall section 1111 abuts against the first portion (1111*a*) of the first inner wall section 1111 proximate to the first end wall 112, and is spaced apart from the second portion (1111*b*) of the first inner wall section 1111 proximate to the second end wall 113, and the second side (2*b*) of the shaft member 2 facing the second inner wall section 1112 abuts against the second portion (1112*b*) of the second inner wall section 1112 proximate to the second end wall 113, and is spaced apart from the first portion (1112*a*) of the second inner wall section 1112 proximate to the first end wall 112.

With reference to FIGS. 9, 12 and 13, during shifting of the foldable device 100 from the spread state to the folded state, the pivot shaft assembly 10 is shifted from the fastened state to the releasable state along with the rotation of the shaft member 2 relative to the base seat 11. Specifically, since the passage 214 is in the form of a slot extending in a direction which is transverse to both a direction parallel to the rotating axis (L1) and a direction parallel to the central axis (L2), i.e., along a direction transverse to the lengthwise direction of the shaft member 2, which coincides with the extension of the fastener releasing portion 14, the fastener releasing portion 14 smoothly slides into the passage 214, the engaging end 321 of the engaging protrusion 32 abuts against the fastener releasing portion 14 and is moved from the narrow section 141 to the wide section 142 so as to be pressed by the wide section 142 to be retreated into the retreated hole 221. Since the passage 214 is configured to permit the fastener releasing portion 14 to be guided by and slided into the passage 214 so as to prevent deflection of the engaging protrusion 32 relative to the fastener releasing portion 14 when pressed by the fastener releasing portion 14, the engaging protrusion 32 may be pressed and retreated into the retreated hole 221 smoothly and reliably. In this state, the user can move and retract the movable tubular piece 23 into the tubular seat 21 and the fixed tubular piece 22 for folding the foldable device 100. When the movable tubular piece 23 is moved relative to the fixed tubular piece 22, the slope edge surface 3211 of the engaging protrusion 32 facilitates disengagement of the engaging end 321 from the retreated hole 221.

In this embodiment, each support shaft 20 has the same construction as that of the shaft member 2, and each releasing guiding portion 15 is similar to the fastener releasing portion 14. Thus, when the foldable device 100 is shifted from the spread state to the folded state, each support shaft 20 is shifted to a releasable state by means of the corresponding releasing guiding portion 15.

As illustrated, with the fastener releasing portion 14 of the base seat 11, during shifting of the foldable device 100 from the spread state to the folded state, the engaging protrusion 32 of the fastening member 3 is pressed by the fastener releasing portion 14 along with the rotation of the shaft member 2 and retreated into the retreated hole 221 so as to shift the shaft member 2 to the releasable state for permitting retraction of the movable tubular piece 23 into the tubular seat 21 and the fixed tubular piece 22, which renders the folding operation of the shaft member 2 easy and rapid, and avoids pinching the user.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A pivot shaft assembly for a foldable device, comprising:

a pivot base including a base seat, an axial hole which extends through said base seat in a first direction, and a fastener releasing portion which is disposed on said base seat;

a shaft member extending along a central axis through said axial hole, said shaft member including a fixed tubular piece which extends through said axial hole and which has a fixed tubular wall surrounding the central axis, and a movable tubular piece which is movably disposed within said fixed tubular piece and which has a movable tubular wall surrounding the central axis, said fixed tubular piece being pivotably coupled with said base seat about a rotating axis which is transverse to the central axis, said fixed tubular piece having a retreated hole which extends radially relative to the central axis through said fixed tubular wall, said movable tubular piece having a through hole which extends radially relative to the central axis through said movable tubular wall; and a fastening member disposed within said movable tubular piece, said fastening member having an engaging protrusion which resiliently projects from said through hole and which has an engaging end disposed outwardly of said through hole, wherein, when said pivot shaft assembly is in a fastened state, said shaft member is inclined relative to the first direction by a predetermined inclined angle, said retreated hole of said fixed tubular piece is remote from said fastener releasing portion, said through hole is aligned with said retreated hole, said engaging protrusion extends through said retreated hole to have said engaging end be outwardly of said retreated hole such that said movable tubular piece is not movable relative to said fixed tubular piece, and wherein, during shifting of said pivot shaft assembly to a releasable state where said shaft member extends parallel to the first direction, said engaging protrusion abuts against and is pressed by said fastener releasing portion along with rotation of said shaft member relative to said base seat to bring said engaging end to be retreated into said retreated hole so as to permit movement of said movable tubular piece relative to said fixed tubular piece.

2. The pivot shaft assembly of claim 1, wherein said base seat includes an inner seat wall which defines said axial hole, a first end wall and a second end wall which are respectively connected with two sides of said inner seat wall along the first direction (Z) and opposite to each other, and an axle seat portion which protrudes from said first end wall, said fastener releasing portion projecting from said axle seat portion toward said axial hole.

3. The pivot shaft assembly of claim 2, wherein said shaft member further includes a tubular seat which surrounds and is securely connected with said fixed tubular piece, said tubular seat having an inner surrounding surface which faces and surrounds said fixed tubular wall, an outer surrounding surface which is radially opposite to said inner surrounding surface and which is pivotably connected with said base seat, and a fastener hole which extends from said inner surrounding surface to said outer surrounding surface and which is in communication with said retreated hole, said outer surrounding surface having a passage which is formed in communication with said fastener hole, said passage having a width to permit insertion of said fastener releasing portion therein, wherein, when said pivot shaft assembly is in the fastened state, said engaging protrusion extends through said fastener hole to have said engaging end be outwardly of said fastener hole, and wherein, during the shifting of said pivot shaft assembly from the fastened state to the releasable state, said fastener releasing portion slides into said passage for abutting against and pressing said engaging end of said engaging protrusion.

4. The pivot shaft assembly of claim 3, wherein said passage is in the form of a slot extending in a direction which is transverse to both a direction parallel to the rotating axis and a direction parallel to the central axis.

5. The pivot shaft assembly of claim 2, wherein said axle seat portion is spaced apart from said axial hole along a direction parallel to the rotating axis, said fastener releasing portion protruding from said axle seat portion along the direction parallel to the rotating axis, said retreated hole and said through hole respectively extending through said fixed tubular wall and said movable tubular wall in the direction parallel to the rotating axis.

6. The pivot shaft assembly of claim 2, wherein the rotating axis extends along a second direction which is transverse to the first direction, said inner seat wall having a first inner wall section and a second inner wall section which are opposite to each other along a third direction that is transverse to both the first direction and the second direction, and at two sides of said axial hole, respectively, and a connecting wall section which interconnects said first inner wall section and said second inner wall section and on which said shaft member is pivotably disposed, each of said first inner wall section and said second inner wall section extending and being inclined relative to the first direction such that, when said shaft member extends parallel to the first direction, a first side of said shaft member facing said first inner wall section abuts against a first portion of said first inner wall section proximate to said first end wall, and is spaced apart from a second portion of said first inner wall section proximate to said second end wall, and a second side of said shaft member facing said second inner wall section abuts against a second portion of said second inner wall section proximate to said second end wall, and is spaced apart from a first portion of said second inner wall section proximate to said first end wall, and such that, when said shaft member is inclined relative to the first direction by the predetermined inclined angle, said first side of said shaft member abuts against said second portion of said first inner wall section and is spaced apart from said first portion of said first inner wall section, and said second side of said shaft member abuts against said first portion of said second inner wall section and is spaced apart from said second portion of said second inner wall section.

7. The pivot shaft assembly of claim 6, wherein said fastener releasing portion has a narrow section which extends from said axle seat portion toward said axial hole by a length and which is formed proximal to said second inner wall section, and a wide section which extends from said axle seat portion toward said axial hole by a length that is larger than the length of said narrow section and which is formed proximal to said first inner wall section such that, during the shifting of said pivot shaft assembly from the fastened state to the releasable state, said engaging protrusion abuts against said fastener releasing portion from said narrow section to said wide section so as to be pressed by said wide section to be retreated into said retreated hole.

8. The pivot shaft assembly of claim 1, wherein said fastening member further has a leaf spring which is disposed on said movable tubular piece, said leaf spring having a curved portion which extends arcuately to terminate at two ends opposite to each other, and first and second biasing portions which respectively extend from said two ends of said curved portion and away from each other, said first biasing portion abutting against said movable tubular piece, said second biasing portion being connected with said engaging protrusion to bias said engaging protrusion away from said first biasing portion.

9. The pivot shaft assembly of claim 1, wherein said engaging protrusion has a slope edge surface at said engaging end to facilitate disengagement of said engaging end from said retreated hole when said movable tubular piece is moved relative to said fixed tubular piece.

* * * * *